United States Patent
Lomelin-Stoupignan et al.

(10) Patent No.: US 7,380,204 B2
(45) Date of Patent: May 27, 2008

(54) INFRASTRUCTURE FOR GENERATING WEB CONTENT

(75) Inventors: Mauricio Lomelin-Stoupignan, Seattle, WA (US); Marcelo Aizenstein Furman Calbucci, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 401 days.

(21) Appl. No.: 10/373,362

(22) Filed: Feb. 24, 2003

(65) Prior Publication Data

US 2004/0168123 A1     Aug. 26, 2004

(51) Int. Cl.
*G06F 17/00*     (2006.01)

(52) U.S. Cl. .................. 715/234; 715/200; 715/235

(58) Field of Classification Search ............. 715/513, 715/501.1, 530, 520, 500, 517, 234, 200, 715/205, 246, 255, 235–236
See application file for complete search history.

(56) References Cited

U.S. PATENT DOCUMENTS

| | | | | |
|---|---|---|---|---|
| 5,649,186 A | * | 7/1997 | Ferguson | 707/10 |
| 5,860,073 A | * | 1/1999 | Ferrel et al. | 715/522 |
| 5,983,227 A | * | 11/1999 | Nazem et al. | 707/10 |
| 6,012,098 A | * | 1/2000 | Bayeh et al. | 709/246 |
| 6,023,701 A | | 2/2000 | Malik et al. | 707/10 |
| 6,026,433 A | * | 2/2000 | D'Arlach et al. | 709/217 |
| 6,052,514 A | * | 4/2000 | Gill et al. | 715/733 |
| 6,112,242 A | * | 8/2000 | Jois et al. | 709/225 |
| 6,335,737 B1 | | 1/2002 | Grossman et al. | 345/719 |
| 6,526,440 B1 | | 2/2003 | Bharat | 709/219 |
| 6,529,903 B2 | | 3/2003 | Smith et al. | 707/7 |
| 6,615,209 B1 | | 9/2003 | Gomes et al. | 707/5 |
| 6,658,423 B1 | | 12/2003 | Pugh et al. | 707/102 |
| 6,678,681 B1 | | 1/2004 | Brin | 707/6 |
| 6,920,607 B1 | * | 7/2005 | Ali et al. | 715/501.1 |

(Continued)

FOREIGN PATENT DOCUMENTS

EP     1 170 672 A1     1/2002

OTHER PUBLICATIONS

Brin, S. et al., "The Anatomy of a Large-Scale Hypertextual Web Search Engine", *The Anatomy of a Search Engine*, Aug. 7, 2000, http://www7.scu.edu.au/programme/fullpapers/1921/com1921.htm, 18 pages.

(Continued)

*Primary Examiner*—Thu Huynh
(74) *Attorney, Agent, or Firm*—Woodcock Washburn LLP (57) ABSTRACT

An architecture for presenting web content that modularizes the various components of that content. A "wire frame" defines spatial regions of a page of content. The regions are called "slots." A "view" defines a mapping or binding between the slots in a wire frame, and objects that generate content. A rendering engine fills the slots with content based on the objects bound to the slots. Slots can be bound to controls, eXtensible Style Language (XSL) tags, or other views. Controls are executable or interpretable code that generate content to fill a slot. An XSL processor can also generate such content based on an XSL tag. Additionally, views can be used recursively so that the content of a slot can be generated by another view. Controls can receive parameters from a configuration file, so that a given control can produce different variations of a given underlying piece of content.

14 Claims, 9 Drawing Sheets

U.S. PATENT DOCUMENTS

| | | | |
|---|---|---|---|
| 2002/0123988 A1 | 9/2002 | Dean et al. | 707/3 |
| 2002/0129058 A1* | 9/2002 | Story et al. | 707/513 |
| 2002/0133481 A1 | 9/2002 | Smith et al. | 707/3 |
| 2002/0156815 A1 | 10/2002 | Davia | 707/517 |
| 2003/0145305 A1* | 7/2003 | Ruggier | 717/100 |
| 2004/0010753 A1* | 1/2004 | Salter et al. | 715/513 |

OTHER PUBLICATIONS

Challenger, J. et al., "A Publishing System for Efficiently Creating Dynamic Web Content", *INFOCOM, 19th Annual Joint Conference of the IEEE Computer and Communications Societies*, 2000, 2, 844-853.

* cited by examiner

INFRASTRUCTURE FOR GENERATING WEB CONTENT

FIELD OF THE INVENTION

The present invention relates generally to the field of computing. More particularly, the present invention provides an infrastructure that can be used to dynamically create web content, such as the web pages created by portal sites and search engines.

BACKGROUND OF THE INVENTION

A conventional web page comprises content in a markup language, such as Hypertext Markup Language (HTML) or eXtensible Hypertext Markup Language (XHTML), which is suitable for rendering by a web browser. Some web pages are static—i.e., a piece of constant, unchanging HTML or XHTML content may be stored in a file that can be downloaded to a client machine and displayed on a browser. However, most commercial web content, such as content provided by search sites, portal sites, E-commerce sites, is not static, but rather is generated dynamically so that it can be personalized for the user or generated in response to some input from the user.

Dynamically-generated content is generated by a program designed for that purpose. Such a program is a module of executable or interpretable code that creates content according to set of rules or procedures. For example, when a user transmits a query to a search engine site, the search engine consults various sources (e.g., databases of known web pages) to produce results, and then a content-generating program at the search engine site generates a page of HTML content that includes the results, and transmits that page to the user. Clearly, such a results page must be generated dynamically, since the content of the results page will differ depending upon what query the user has submitted.

While existing software is effective at dynamically generating web content, such software suffers from a lack of flexibility when there is a creative change to the content that the program needs to produce. For example, a search engine may use a program that displays search results as a list of the titles of web pages that the search engine has located. However, if the operator of the search engine wishes to introduce a new way of presenting these results (e.g., enhancing the list with thumbnail images of the located web pages), in general the only way to accomplish this change is to rewrite the program (or, at least, to add code to the program that supports inclusion of the thumbnail images).

Most web content can be viewed as being built from modular "building blocks" of smaller pieces of content. For example, a search results page is made up of various separate pieces of content (e.g., a logo, a copyright notice, the results of the most recent search, a search box for entering another search query, advertisements, etc.). In theory, the modular nature of web content suggests that a single program could drive the content generation process, by building content from modular building blocks that the content designer would provide at run time. A creative change to the content would not necessitate a change to such a program, since the program could simply be directed to use different building blocks to produce different content. However, conventional content-generation software is extremely limited in terms of what types of created changes can be made to the content without changing the software itself.

In view of the foregoing, there is a need for a system that overcomes the drawbacks of the prior art.

SUMMARY OF THE INVENTION

The present invention provides an infrastructure for generating content, such as web pages. The infrastructure is based on the idea that a page of content can be built from smaller components that can be designed, implemented, and modified separately. The present invention allows these smaller components, as well as the way they fit together, to be specified to the content-generation software at runtime.

According to the invention, the creation of content is specified by a combination of "wire frames," "views," and content-generating objects. A wire frame is a data structure that defines spatial regions of a piece of content. For example, a wire frame could define a web page as having four rectangular regions, running vertically from the top of the page to the bottom. Each of these regions is called a "slot." A "view" is a data structure that binds each of the slots in a wire frame to a content-generating object, or a sequence of content-generating objects (or, alternatively, designates a particular slot as being empty).

In order to render a view, a rendering engine accesses the wire frame identified in the view and, for each slot in that wire frame, causes the content-generating object bound to that slot to produce content. The rendering engine then places the content produced by the object into the slot. The process is repeated for each slot in the wire frame. The output of the rendering engine is a piece of content (e.g., an HTML web page) that contains content produced by each of the content-generating objects in the appropriate region of the wire frame.

Content-generating objects include "controls," eXtensible Style Language (XSL) tags, and views. A control is executable or interpretable code that generates HTML or XHTML content that is to be placed into a slot. An XSL tag is a datum that can be used by XSL processing software to generate HTML or XHTML content. Since evaluating a view results in the production of content, a view is itself a content-generating object. Thus, content can be built hierarchically from views that are actually sub-views, sub-sub-views, etc., of the top-level view. When the rendering engine encounters a slot that is bound to a sub-view, the rendering engine can call itself recursively to generate content for the slot based on that view.

According to one feature of the invention, controls can exhibit different behavior based on parameters contained in a configuration file. Thus, a given control can be designed to produce different variations of a piece of content based on which parameter is provided in the configuration file.

Other features of the invention are described below.

BRIEF DESCRIPTION OF THE DRAWINGS

The foregoing summary, as well as the following detailed description of preferred embodiments, is better understood when read in conjunction with the appended drawings. For the purpose of illustrating the invention, there is shown in the drawings exemplary constructions of the invention; however, the invention is not limited to the specific methods and instrumentalities disclosed. In the drawings.

DETAILED DESCRIPTION OF THE INVENTION

Overview

Much commercial web content is built from smaller pieces of content that fit together graphically in a defined way. The present invention provides an infrastructure that allows a content provider to specify how content is to be constructed based on these smaller pieces. The infrastructure includes a rendering engine that dynamically generates the content based on the content provider's specification.

Exemplary Computing Environment

Figure 1:
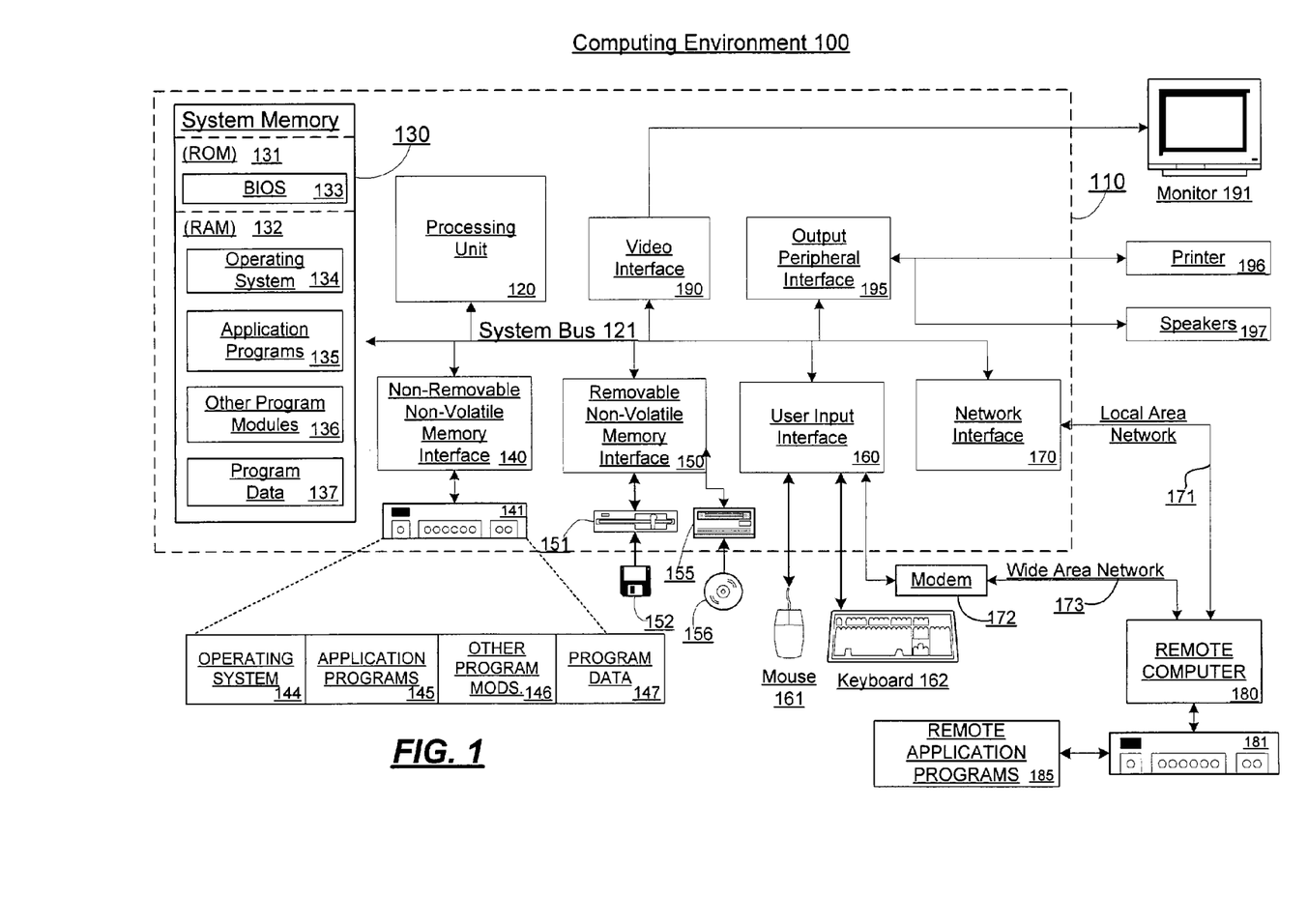
FIG. 1 is a block diagram of an exemplary computing environment in which aspects of the invention may be implemented.

FIG. 1 shows an exemplary computing environment in which aspects of the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, embedded systems, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network or other data transmission medium. In a distributed computing environment, program modules and other data may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus (also known as Mezzanine bus).

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CDROM, digital versatile disks (DVD) or other optical disk storage, magnetic cassettes, magnetic tape, magnetic disk storage or other magnetic storage devices, or any other medium which can be used to store the desired information and which can accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 140 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156, such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 20 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Exemplary Web Browser

Figure 2:
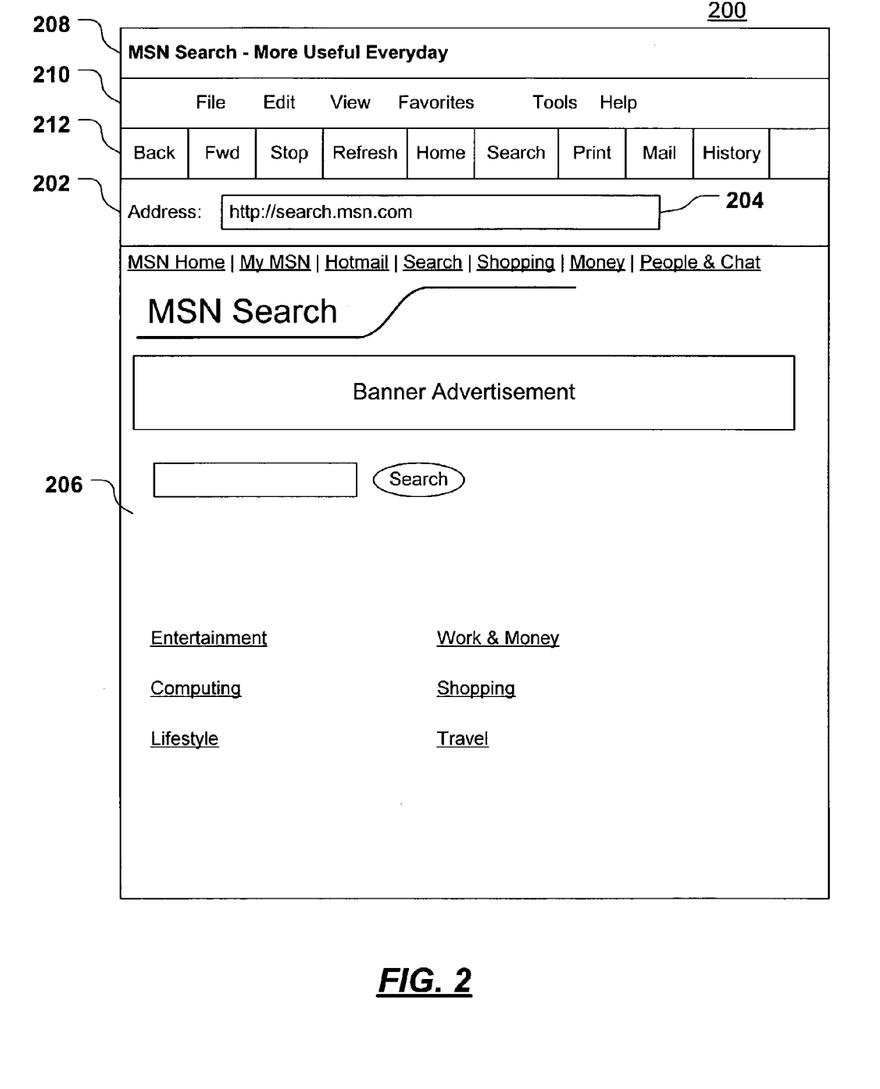
FIG. 2 is a block diagram of the user interface of an exemplary web browser.

FIG. 2 shows the visual interface of an exemplary web browser 200. As is known in the art, a web browser is a piece of software that allows a user to interact with certain types of content (e.g., HTML content), and to retrieve such content from a network. Browser 200 may, for example, constitute software that is stored on computer 110 (shown in FIG. 1), and that executes on processing unit 120 (shown in FIG. 1). Browser 200 may access content from a wide area network 173 (shown in FIG. 1), such as the Internet, to which computer 110 is connected. Typically, browser 200 is also able to access content that is stored locally on computer 110.

The exemplary browser of FIG. 2 displays various information to the user. In particular, browser 200 displays a navigation bar 202 to the user. Navigation bar 202 includes a box 204, into which a user may enter a Uniform Resource Locator (URL), into order to point the browser to a particular content item. In the example of FIG. 2, the user has entered a URL into box 204, thereby indicating that the user wishes to access the content identified by that URL. Browser 200 retrieves this content from wherever on the Internet it may be located, and displays the content in viewing area 206. In the example of FIG. 2, the content is delivered in HTML or XHTML. (The phrase "http" in the URL stands for "Hypertext Transfer Protocol; it's presence in a URL indicates that the underlying content is HTML or XHTML content.) Browser 200 contains, or otherwise accesses, an HTML and/or XHTML interpreter that renders the HTML or XHTML content received by browser 200. In the example of FIG. 2, browser 200 displays the title of the content ("MSN Search—More Useful Everyday") in title bar 208.

A typical browser, such as browser 200, also allows the user to perform various functions, such as: printing, mailing, or saving the displayed content; using a list of "favorites" or "bookmarks" to navigate to other content; changing the default font for text content, etc. This functionality is exposed to the user by means of menu bar 210 and/or buttons 212.

As discussed below, the invention provides an infrastructure for generating content, such as that which is displayed in viewing area 206.

Data Structures for Creating Presentations of Content

The invention provides an infrastructure that generalizes and abstracts the process by which content, such as the XHTML content for a web page, is created. (From this point forward, examples of browser-renderable content shall refer to that content as being XHTML content. However, it will be understood that the invention can be used to generate other types of content, such as HTML, Wireless Markup Language (WML), Voice eXtensible Markup Language (VXML), etc.)

The infrastructure of the invention makes use of four types of data structures: wire frames, views, controls, and configuration files.

A "wire frame" is a data structure that defines spatial regions of a page of content. Each region is called a "slot."

A "control" comprises executable or interpretable code that dynamically generates XHTML content, to be placed within a particular slot defined by a wire frame.

A "view" is a data structure that creates a mapping between a particular slot and a particular control (or a particular sequence of controls). A view can also map an eXtensible Style Language (XSL) tag, or another view, into a slot (a view can also map sequence of XSL tags or views into a slot); the mapping of XSL tags and views into slots is discussed in greater detail below.

A "configuration file" contains data that is used by controls to affect their behavior. For example, a control may be capable of generating two or more different variations of a particular piece of content, and the configuration file may contain a parameter that indicates which of these different variations should be generated.

Figure 3:
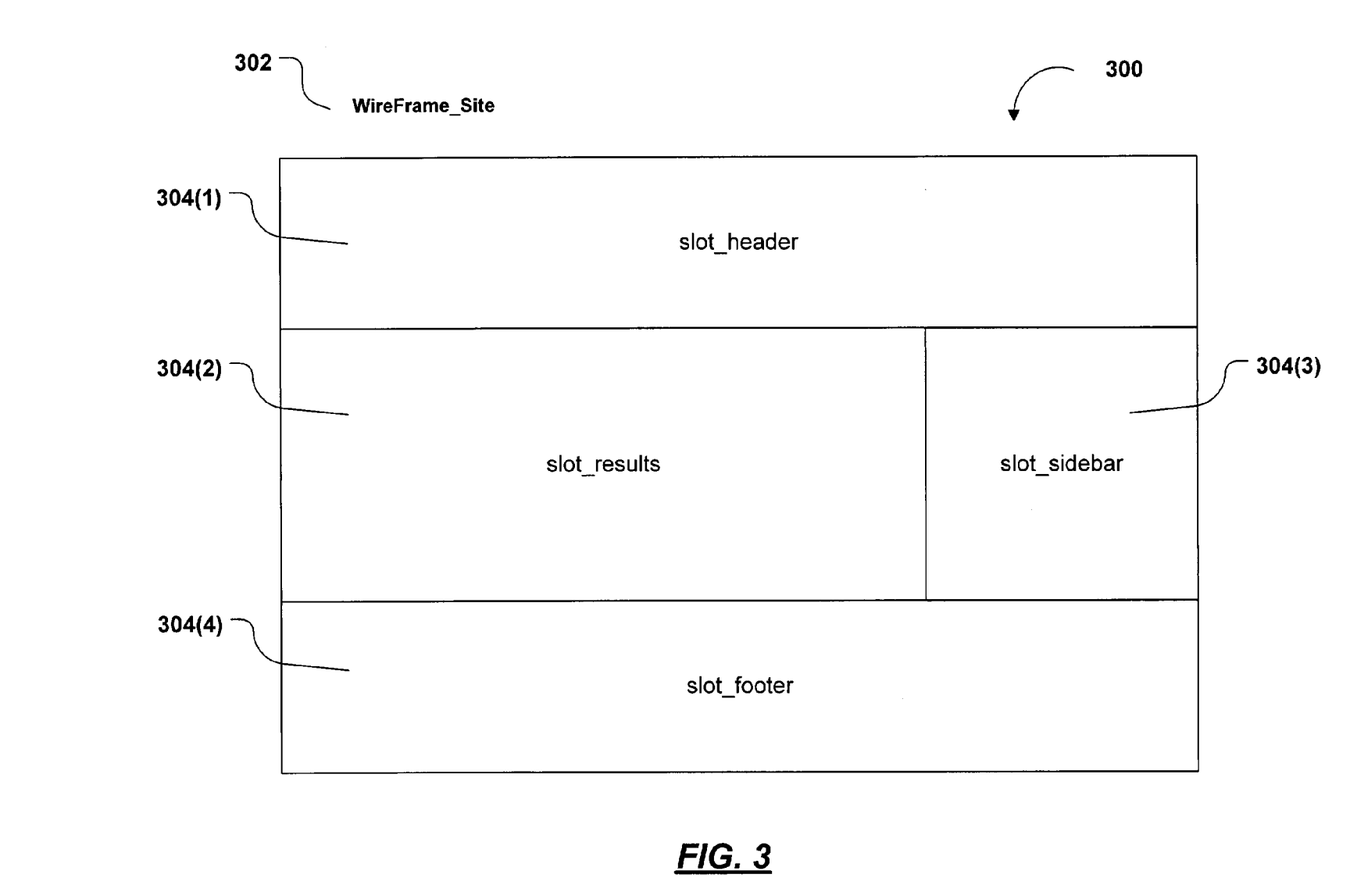
FIG. 3 is a block diagram of an first exemplary wire frame.

FIG. 3 shows an exemplary wire frame 300. Wire frame 300 divides a conceptual page of content into regions, which, as noted above, are called "slots." In the example of FIG. 3, there are four slots, 304(1), 304(2), 304(3), and 304(4). Each of the slots has a name; in this example, the names of slots 304(1) through 304(4) are "slot_header," "slot_results," "slot_sidebar, " and "slot_footer," respectively. Wire frame 300 itself also has a name ("Wireframe_Site", in this example). As discussed below, the names are used in a view data structure to identify the wire frame and each of its slots.

Typically, the wire frame is represented as an XHTML structure. Thus, the exemplary wire frame shown in FIG. 3 can be defined as follows:

```
<wireframe name="wireframe_site">
    <div><slot name="slot_header" /></div>
    <table>
        <tr>
            <td><slot name="slot_results" /></td>
            <td><slot name="slot_sidebar" /></td>
        </tr>
    </table>
    <div><slot name="slot_footer" /></div>
</wireframe>
```

As can be seen, the above XHTML definition lays out four regions of content: a top region with the slot name "slot_header"; a bottom region with the slot name "slot_footer"; and a two-column table between the top and bottom regions, where the left column is named "slot_results" and the right column is named "slot_sidebar."

Figure 4:
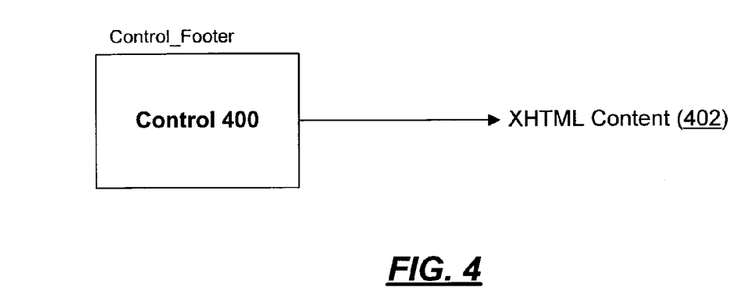
FIG. 4 is a block diagram of a first exemplary control.

FIG. 4 shows an exemplary control 400, which generates XHTML content 402. Control 400 has a name ("Control_Footer," in this example), and, as discussed below, the name is used in a view data structure to identify the control. Control 400 may be used to produce the content that will be inserted into the slot named "slot_footer" in wire frame 300.

Control 400 comprises executable or interpretable code that is configured to dynamically generate XHTML content 402 while it executes. Control 400 may be embodied in various ways. For example, control 400 may comprise machine-executable code (such as an .exe or .dll file), an interpretable script (such as a script in the Java or C# languages), virtual machine code (such as Java bytecode), etc.

The following is an example of pseudo-code that describes the function of control 400. (It will readily be appreciated that the following pseudo-code could be embodied in any of the above-mentioned executable or interpretable components):

```
XHTML Control_Footer ( )
{
    String strFooter;
    strFooter = _
        "<TABLE WIDTH="770" HEIGHT="16"
        CELLPADDING="0"
        CELLSPACING="0" BORDER="0">
        <TR><TD WIDTH="770" HEIGHT="1"
        BGCOLOR="#bdbebd">
        <SPACER TYPE="block" HEIGHT="1"/></TD></TR>
        <TR><TD HEIGHT="15" class="nsf">  
        "
    strFooter = strFooter & file_read(copyright_notice.txt);
    strFooter = _
        "</TD></TR></TABLE>"
    return strFooter;
}
```

The above pseudo-code defines control 400 as a function named "Control_Footer" that generates and returns XHTML content. In this example, Control_Footer returns the XHTML code for a table that has a particular size and background color, and that contains a text string such as: "Copyright 2003 Microsoft Corporation—All Rights Reserved" (or whatever text string is contained in the file "copyright_notice.txt").

Figure 5:
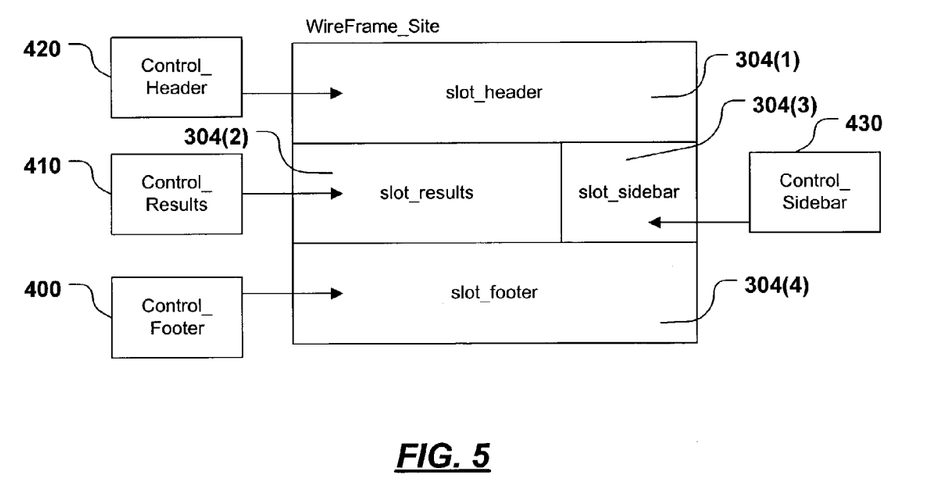
FIG. 5 is a block diagram of a first exemplary view that binds controls to the first exemplary wire frame.

As noted above, controls may be mapped (or "bound") to the slots of a wire frame by means of a structure called a "view." FIG. 5 shows an exemplary mapping of controls into the slots of wire frame 200. In this example, control 420 (named "Control_Header") maps to slot 304(1); control 410 ("Control_Results") maps to slot 304(2); control 430 ("Control_Sidebar") maps to slot 304(3); and control 410 ("Control_Footer," as described above in connection with FIG. 4) maps to slot 304(4). This mapping defines a page of XHTML content based on wire frame 200, in which each of the regions defined by slots 304(1), 304(2), 304(3), and 304(4) will be filled with the XHTML content generated by controls 420, 410, 430, and 400, respectively. This mapping represents a view 500.

View 500, as depicted in FIG. 5, can be represented as the following data structure:

```
<view name="view_Classic" wireframe="wireframe_site">
    <binding slot="slot_header">
        <ctl:Control_Header/>
    </binding>
    <binding slot="slot_results">
        <ctl:Control_Results />
    </binding>
    <binding slot="slot_sidebar">
        <ctl:Control_Sidebar />
    </binding>
    <binding slot="slot_footer">
        <ctl:Control_Footer />
    </binding>
</view>
```

The above-shown data structure assigns the name "view_Classic" to the view. Since a typical system will have several views, the name permits the view to be identified from among the several views. As can be seen, the data structure contains a "binding" for each slot, and indicates a particular control that is to be "bound" to the slot.

While the above example shows a single control being bound to each slot, it should be noted that plural controls can be bound to a single slot to be executed in a sequence. Thus, the binding for "slot-header" could read as follows:

```
<binding slot="slot header">
    <ctl:Control_A />
    <ctl:Control_B />
    <ctl:Control_C />
</binding>
```

This binding would indicate that controls named "Control_A","Control_B",and "Control_C" are to be executed in the sequence indicated in order to fill slot_header with content.

Additionally, while the above example shows only controls being bound to slots, as previously noted the invention also permits a view or an XSL tag to be bound to a slot. The binding of a control to a slot is the simplest example of a binding. However, the concept of a slot binding can be generalized, and FIGS. 6-12 show an example of such a generalization.

An Example of Using a View to Specify Content

As discussed above, a control is a software object that generates XHTML content. To "map" or "bind" a control to a slot means that the slot will be filled with XHTML content that has been generated by the control. However, a control is not the only type of object that generates XHTML content. In particular, it is known in the art that XSL tags can be evaluated to produce XHTML content. Additionally, when a view is evaluated to place the appropriate content in the slots of a wire frame, the result of this evaluation is XHTML content, so a view is yet another object that produces XHTML content. With these facts in mind, it can be seen that both XSL tags and views, as well as any other type of object that can be evaluated to produce XHTML content, can be mapped to a slot.

Figure 6:
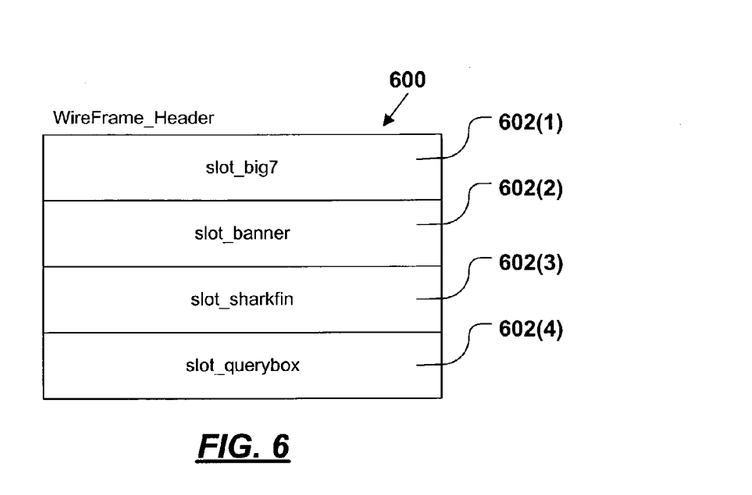
FIG. 6 is a block diagram of a second exemplary wire frame.

FIGS. 6-11 show how to build a view that can be bound to the slot named "slot_header" in wire frame 300 (shown in FIG. 3). As with the previous examples, a view contains the slot bindings for a particular wire frame, so it is necessary to define a wire frame that will be used in the view. FIG. 6 shows a wire frame 600, named "WireFrame_Header." Wire frame 600 has four slots, 602(1), 602(2), 602(3), and 602(4), named "slot_big7," "slot_banner," "slot_sharkfin," and "slot_querybox," respectively. This wire frame can be defined by the following data structure:

```
<wireframe name="WireFrame_Header">
    <div><slot name="slot_big7" /></div>
    <div><slot name="slot_banner" /></div>
    <div><slot name="slot_sharkfin" /></div>
    <div><slot name="slot_querybox" /></div>
</wireframe>
```

FIGS. 7-10 show the various objects that will be bound to slots 602(1) through 602(4) in wire frame 600.

Figure 7:
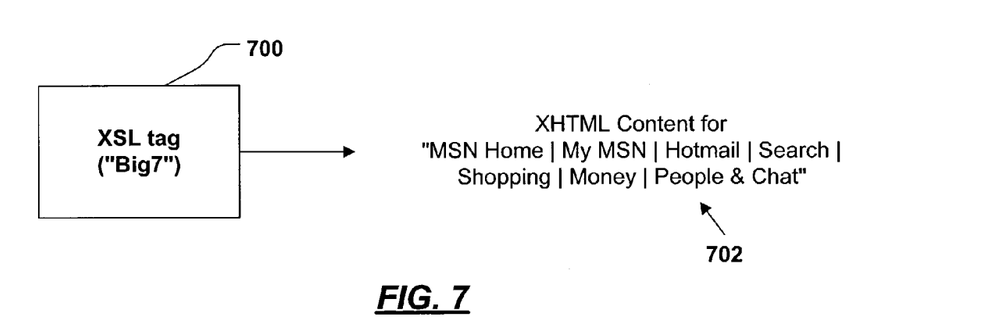
FIGS. 7-8 are block diagrams of exemplary eXtensible Style Language (XSL) tags.

FIG. 7 shows an XSL tag 700 named "Big7." XSL tag 700 is associated with XSL data that, with the aid of appropriate XSL processing software, can be used to generate XHTML content containing the "big 7" links 702 that appear at the top of the United States version of the search.msn.com web site. These "big 7" links are "MSN Home"; "My MSN"; "Hotmail"; "Search"; "Shopping"; "Money"; and "People & Chat".

Figure 8:
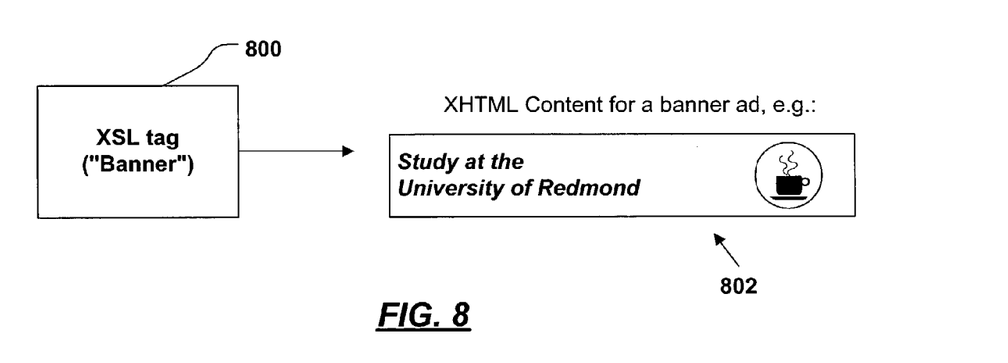

FIG. 8 shows another XSL tag 800, which is named "Banner." XSL tag 800 can be evaluated by XSL processing software in the same manner as XSL tag 700. However, XSL tag 800 produces a banner advertisement 802. In the example of FIG. 8, this banner advertisement is for the University of Redmond.

Figure 9:
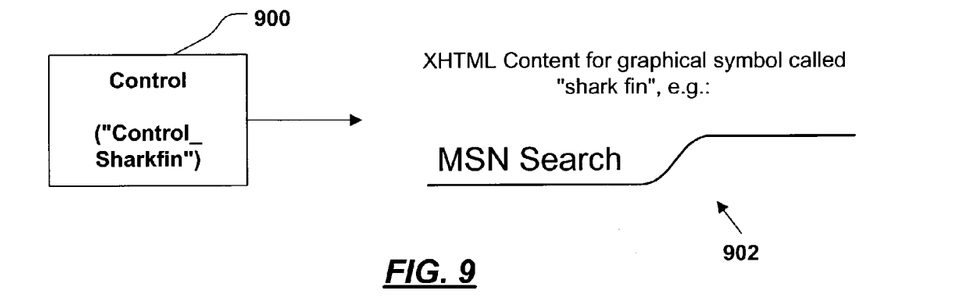
FIG. 9 is a block diagram of a second exemplary control.

FIG. 9 shows a control 900 named "Control_Sharkfin." Control 900 generates XHTML content that shows the letters MSN next to the curved line graphic (reference numeral 902), which appears on the search.msn.com web site. (The graphic derives its name from the dorsal fin of a shark, of which the curved line is suggestive.)

Figure 10:
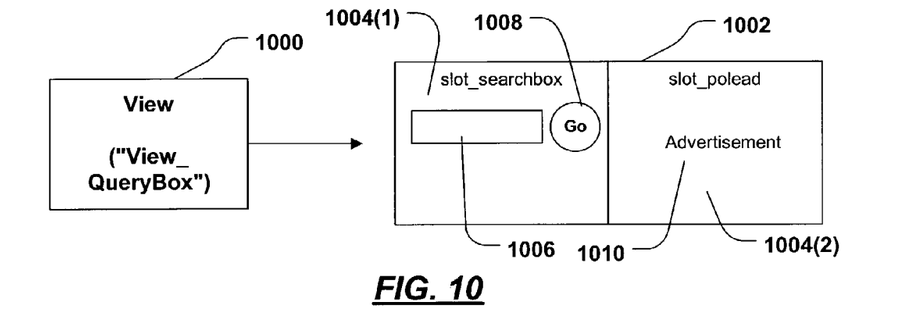
FIG. 10 is a block diagram of a second exemplary view.

FIG. 10 shows a view 1000 named "View_QueryBox." As with view 500 (discussed above in connection with FIG. 5), view 1000 represents a mapping or binding between slots of a wire frame, and the objects (e.g., controls, XSL tags, or views) that will generate content for those slots. In the example of FIG. 10, wire frame 1002 has two slots 1004(1) and 1004(2), named "slot_searchbox" and "slot_polead," respectively. View 1000 binds slot 1004(1) ("slot_searchbox") to an object that produces XHTML content for a box 1006 into which a user may type a query, and a "go" button 1008, which the user may click to send the query to a search engine. Slot 1004(2) ("slot_polead") is bound to an object that produces XHTML content for an advertisement 1010.

Figure 11:
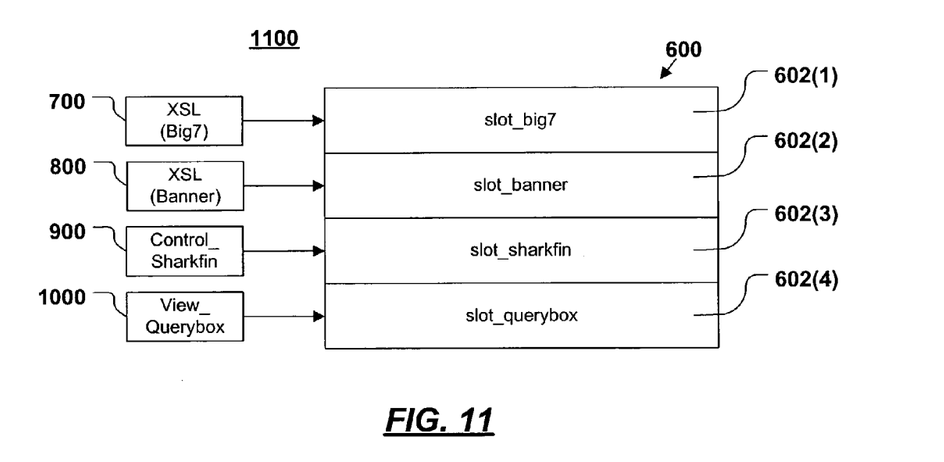
FIG. 11 is a block diagram of a third exemplary view.

A view may be created that binds XSL tags 700 and 800, control 900, and view 1000, to the slots of wire frame 600 (shown in FIG. 6). FIG. 11 shows such a binding. XSL tag 700 ("Big7") is bound to slot 602(1) ("slot_big7"). XSL tag 800 ("Banner") is bound to slot 602(2) ("slot_banner"). Control 900 ("Control_Sharkfin") is bound to slot 602(3) ("slot_sharkfin"). View 1000 ("View_QueryBox") is bound to slot 602(4) ("slot_querybox"). The view 1100 defined by this binding may be represented as the following data structure:

```
<view name="view header" wireframe="WireFrame_Header">
    <binding slot="slot_big7">
        <xsl:Big7 />          'XSL yields Big7 HTML
    </binding>
    <binding slot="slot banner">
        <xsl:Banner />        'XSL yields Banner Ad creative
    </binding>
    <binding slot="slot_sharkfin">
        <ctl:Control_Sharkfin />
    </binding>
    <binding slot="slot_querybox">
        <view:View_QueryBox />
    </binding>
</view>
```

The above data structure gives view 1100 the name "view_header," and creates the bindings depicted in FIG. 11. In the above example, it will be noted that each type of object that is bound to a slot is preceded by an designation as to its type—e.g., "xsl:Banner," to indicate that "Banner" is an XSL tag, and the similar phrases "ctl:Control_Sharkfin" and "view:View_QueryBox" to designate controls and views. Using this type of designation is preferable, since controls, XSL tags, and views require different types of processing, and the designation will allow the view rendering engine (discussed below in connection with FIGS. 13-14) to identify easily which type of object it needs to process.

Figure 12:
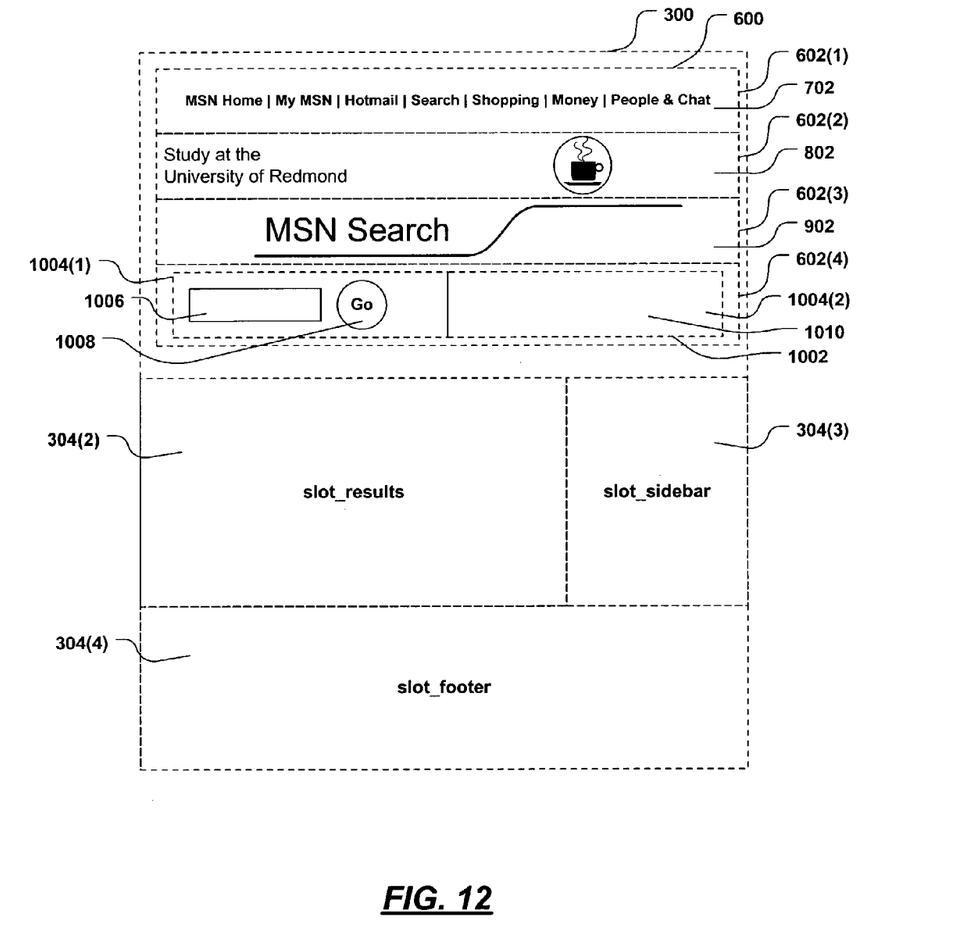
FIG. 12 is a block diagram of exemplary content generated in accordance with aspects of the invention.

As noted above, FIGS. 6-11 show an example in which a view (view 1100) is bound to slot 304(1) ("slot_header") in wire frame 300. (Another view would have to be created to bind the slots of wire frame 300 to the content-generating objects that will fill those slots. This view would include the binding between slot 304(1) and view 1100. The details of such a view can readily be understood from the preceding discussion.) FIG. 12 shows the resulting content that can be created based on this binding. FIG. 12 shows wire frame 300, with its four slots 304(1), 304(2), 304(3), and 304(4). Since slot 304(1) ("slot_header") is bound to view 1100, the wire frame 600 which view 1100 is based) is shown as overlaying slot 304(1). Wire frame 600, in turn, has four slots 602(1), 602(2), 602(3), and 602(4). Of these four slots, slot 602(4) is bound (shown in FIG. 10), which, in turn, is based on wire frame 1002. Thus, wire frame 1002 is shown in FIG. 12 as overlaying slot 602(4).

It can be appreciated from FIG. 12 that the content shown therein forms a hierarchy, where wire frame 1002 is inside a slot of wire frame 600, which, in turn, is inside a slot of wire frame 300. Analyzing the content shown in FIG. 12 from the bottom of the hierarchy up, it can be seen that view 1000 generates the following content: box 1006 and "go" button 1008 (within slot 1004(1) of wire frame 1002), and advertisement 1010 (within slot 1004(2)). This content is located within slot 602(4) of wire frame 600. Wire frame 600 also contains content items 702, 802, and 902, which were generated from XSL tags and controls, as described above in FIGS. 7-9. View 1100 thus generates the content contained within wire frame 600's slots. Since view 1100 has been bound to slot 304(1) of wire frame 300, the content generated by view 1100 is placed within slot 304(1). FIG. 12 also shows slots 304(2)-(4); a view can be specified that binds these slots to controls, XSL tags, and views in the manner described above. While the example of FIGS. 6-12 show each slot being bound to a single control, XSL tag, or view, as noted above a slot can be bound to plural controls, XSL tags, or views (or any combination thereof), which can all be evaluated to fill a given slot.

It should be noted that, while FIG. 12 uses dashed lines to show the outlines of wire frames and their slots, these lines would not actually be included in content that is built from a view. These lines are merely shown in FIG. 12 to demonstrate the hierarchical structure in which content can be built according to the invention.

Architecture for Generating Content from Views

Figure 13:
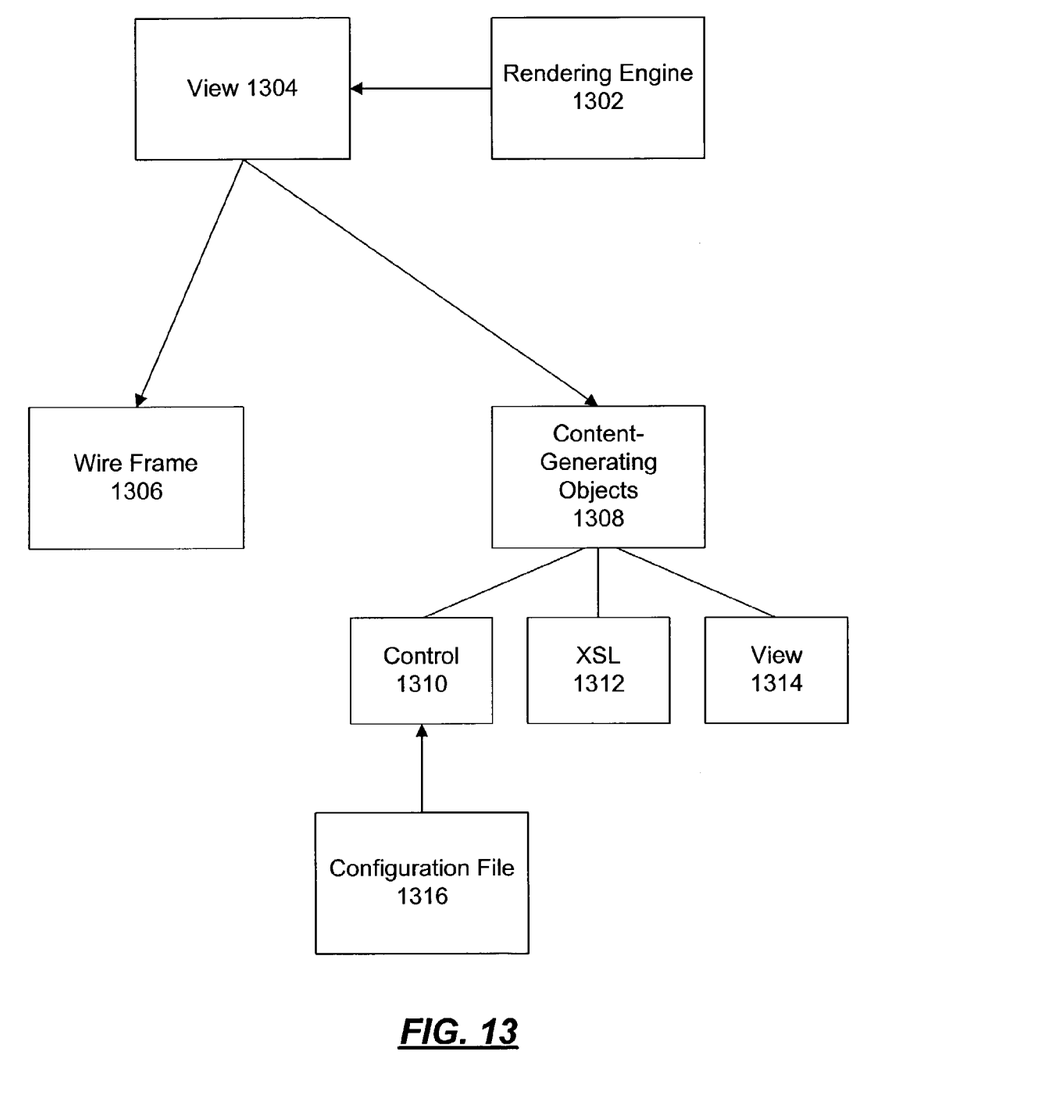
FIG. 13 is a block diagram of an exemplary infrastructure for generating content in accordance with aspects of the invention.

FIG. 13 shows an overview of the various components that are used to generate content in accordance with the invention.

Rendering engine 1302 is a software component that uses a view 1304 to generate XHTML content that is suitable for rendering on a browser (such as browser 200, shown in FIG. 2). Rendering engine may, for example, exist on a search engine server, and may be used to dynamically generate pages of results in response to user queries.

As discussed above, a view, such as view 1304, comprises a mapping or binding between the slots of a wire frame 1308 on the one hand, and content-generating objects 1308 on the other hand. As also discussed above, content-generating objects 1316 can take various form; controls 1310, XSL tags 1312, and views 1314 are examples of objects on which content generation can be based.

Controls 1310, as described above, comprise executable or interpretable code that dynamically generate content. Since controls 1310 may be embodied as programs, they are capable of exhibiting different behavior based on their input. A configuration file 1316 provides this input for controls. For example, the "shark fin" control (reference numeral 900, shown in FIG. 9) may be adapted to generate different versions of the shark fin graphic (e.g., wider or narrower versions) depending upon various circumstance. For example, the search.msn.com web site may generate wide or narrow versions of the shark fin, depending upon whether that web site is being accessed directly through navigation bar 202 (shown in FIG. 2), or is being accessed through a search assistant feature that splits viewing area 206 into two narrow sub-areas. Configuration file 1316 may contain a parameter that is used by the shark fin control to specify which version of the shark fin is to be generated. If the shark fin control has been designed to respond to parameters in a configuration file, then different versions of the shark fin can be created with a single control and multiple configuration files; a different configuration file can be provided to the control depending upon which version of the shark fin graphic is to be produced. Additionally, the configuration information can be specified in the view as part of a slot's binding. For example, the binding:

```
<binding slot="slot_a">
    <control_name="header" mode="default">
</binding>
``` could be used to specify that the "header" control will be used in the default mode, and the similar binding:

```
<binding slot="slot_a">
    <control_name="header" mode="searchpane">
</binding>
``` could be used to specify that the "header" control will be used in the "searchpane" mode. This manner of specifying different modes works similarly to using different configuration files to specify different parameters for the control.

As another example of the use of a configuration file, the infrastructure described herein may be used by a search engine to generate query and results pages. Different users may wish to view the results of a search in different formats—e.g., one user may wish to receive only text descriptions of the search results, while other users may wish to view thumbnail images along with the text descriptions. A single "results" control can be written (e.g., for binding to the "slot_results" slot 304(2), shown in FIG. 3), which is capable of generating results in various formats. The particular format generated by the "results" control depends on a parameter contained in configuration file 1316. The actual format in which the results are presented can be changed simply by changing the configuration file. In one example, several configuration files (each having different parameters) can be provided, and the user can be given the opportunity to change the presentation of results. For example, when the user receives a page containing search results, the user may use a menu on the page to select a different form in which the user would like to receive the results. The user's selection is then transmitted to the search engine server, with a request that the server re-generate the page using a different configuration file.

It should be noted that configuration file 1316 can be embodied as a traditional "file" (i.e., a named object stored in a file system), but is not limited to this embodiment. In general, the "configuration file" represents data that is stored somewhere and can be accessed by a control, regardless of how this data is stored.

Process of Generating Content Based on a View

The process of generating content based on a view can be described by the following pseudo-code:

```
RendererEval(View)
{
    For each Slot in the View's WireFrame
    {
        Find Slot binding in View.Bindings
        If binding exists
            If binding is a Control
                Slot = Evaluate the control
            If binding is an XSL Tag
                Slot = Process XSL
            If binding is a View
                Slot = RendererEval(sub view)
        If binding does not exist
            Slot = empty
    }
}
```

The "RendererEval( )" method described above is carried out, for example, by rendering engine 1302. The method takes a view as a parameter, steps through the slots in the view's wire frame, and generates appropriate XHTML content for each slot based on which object is bound to the slot. If the slot is bound to a control, the control is executed and the slot is filled with the XHTML content generated by the control. If the slot is bound to an XSL tag, then the XSL processing software is applied to the tag to generate the appropriate XHTML content. If the slot is bound to a view, then the view is evaluated to generate XHTML content. In the pseudo-code above, "sub view" is a view that is bound to the slot that the "RendererEval( )" function is currently evaluating. As can be seen in the above pseudo code, RendererEval( ) can call itself recursively to evaluate this sub-view.

Figure 14:
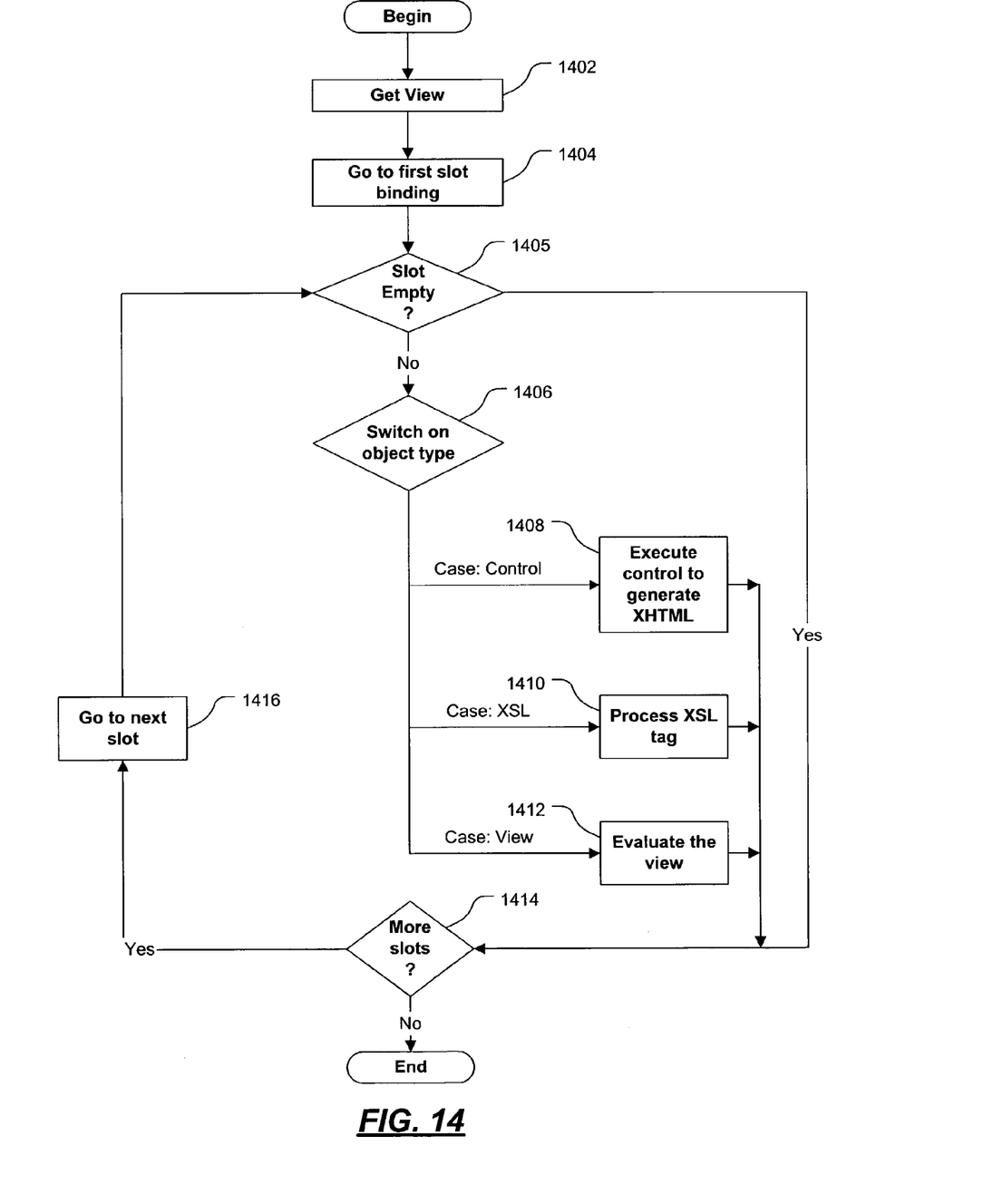
FIG. 14 is a flow diagram of an exemplary process for generating content in accordance with aspects of the invention.

FIG. 14 shows a flowchart of the process carried out by rendering engine 1302. The rendering engine gets the view (block 1402). In the above pseudo-code example, this step is accomplished when the view is passed to the rendering engine's top-level method as a parameter. The rendering engine then examines the first slot binding (block 1404). If the binding is empty (block 1405), then there is no content to place into the slot, so the rendering engine proceeds to block 1414 to determine whether there are any more slots.

If, however, the slot does have a binding, then the rendering engine proceeds to evaluate the object bound to the slot, and fills the slot with appropriate content based on that object. As noted above, the binding preferably indicates whether the slot is bound to a control, an XSL tag, or a view. The rendering engine branches (block 1406) based on which type of object is bound to the slot. If the slot is bound to a control, then the control is executed to produce XHTML content, and the XHTML content is placed into the slot (block 1408). If the slot is bound to an XSL tag, then the XSL tag is processed to generate XHTML content, and that content is placed into the slot (block 1410). If the slot is bound to another view, then this other view is evaluated to generate XHTML content, and that content is placed into the slot (block 1412). As noted above, when a view is encountered in a slot binding, the process of evaluating that view is essentially the same as the process of evaluating the top-level view; block 1412 may, in fact, be implemented as a recursive call to the method that implements the process of FIG. 14.

After the current slot has been processed, the rendering engine determines whether there are any additional slots in the current view (block 1414). If there are no such slots, then the process terminates. If there are additional slots, then the rendering engine proceeds to the next slot (block 1416), and returns to block 1405 to process the next slot.

It is noted that the foregoing examples have been provided merely for the purpose of explanation and are in no way to be construed as limiting of the present invention. While the invention has been described with reference to various embodiments, it is understood that the words which have been used herein are words of description and illustration, rather than words of limitations. Further, although the invention has been described herein with reference to particular means, materials and embodiments, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A computer system for generating content, the system comprising:
   a computer processor executing a software program in a search engine server, the software program comprising:
   a first wire frame data structure that defines a plurality of regions of the content;
   a first set of a plurality of content-generating objects;
   a first view that maps the first set of the plurality of content-generating objects into the regions defined by the first wire frame; and
   a rendering engine in the search engine server that, for each region defined by the first wire frame:
      causes content to be generated based on one of the plurality of content-generating objects from the first set that the first view maps to one of the regions; and
      inserts the generated content into the region;
   wherein one of the plurality of content-generating objects that the first view maps into one of the regions comprise an eXtensible Style Language (XSL) tag, a second view, and a control, wherein the control receives parameters from a configuration file that is accessed by a user to change the presentation of query results provided by the search engine server from a first format to a second format; and
   a monitor displaying the generated content.

2. The system of claim 1, wherein the generated content comprises a Hypertext Markup Language (HTML) or eXtensible Hypertext Markup Language (XHTML) web page.

3. The system of claim 1, wherein the content-generating objects that the first view maps to one of the regions is a control that comprises executable or interpretable code, the generated content being generated by execution of said executable or interpretable code.

4. The system of claim 3, wherein the content generated by the executable or interpretable code is based at least in part on data contained in said configuration file.

5. The system of claim 3, wherein the first view specifies a mode in which the executable or interpretable code is to operate, and wherein the content generated by the executable or interpretable code is based at least in part on the mode.

6. The system of claim 1, wherein the content-generating objects that the first view maps to one of the regions comprises a third view that specifies content by associating a second wire frame with a second set of content-generating objects, the generated content being generated by the rendering engine's evaluating the third view.

7. The system of claim 1, wherein at least one of the regions defined by the first wire frame is not mapped with any content-generating objects by the first view, and wherein the rendering engine causes the content item to reflect the absence of content in said one of the regions defined by the first wire frame.

8. A computer-executed method of generating content, the method comprising:

accessing a first view that specifies an association between a set of slots of a wire frame and a set of a plurality of content-generating objects, the slots of the wire frame defining regions of the content;

evaluating the first view by a rendering engine on a search engine server;

for each one of the slots, generating content into said one of the slots based on one of the plurality of content-generating objects that the first view associates with said one of the slots, wherein one of the plurality of content-generating objects comprises an eXtensible Style Language (XSL) tag, a second view, and a control, wherein the control receives parameters from a configuration file that is accessed by a user to change the presentation of query results provided by the search engine server from a first format to a second format; and displaying the generated content on a computer monitor.

9. The method of claim 8, wherein the generated content comprises a Hypertext Markup Language (HTML) or eXtensible Hypertext Markup Language (XHTML) web page.

10. The method of claim 8, wherein the content-generating objects that the first view associates with said one of the slots comprises executable or interpretable code, and wherein the content inserted into said one of the slots is generated by executing said executable or interpretable code.

11. The method of claim 10, wherein the executable or interpretable code takes into account data contained in a configuration file in determining which content to generate.

12. The method of claim 10, wherein the executable or interpretable code takes into account a mode specified in the first view in determining which content to generate.

13. The method of claim 8, wherein the content-generating objects that the first view associates with said one of the slots comprises a sub-view, and wherein the method further comprises:

evaluating the sub-view to generate content to be inserted into said one of the slots.

14. A computer-readable storage medium encoded with computer-executable instructions, which is executed to perform a method of generating a web page, the method comprising:

receiving a first view that specifies a correspondence between a first wire frame and a first set of content-generating objects, the first wire frame comprising a plurality of regions of the web page, at least one of the regions corresponding to the first set of content-generating objects, a second set of content-generating objects, and a third set of content generating objects, the first set of content-generating objects comprising an eXtensible Style Language (XSL) tag that specifies to an XSL processor content to be generated or retrieved, the second set of content generating objects comprising a second view, the thirds set of content-generating objects comprising a control, wherein the control receives parameters a configuration file that is accessed by a user to change the presentation of query results provided by a search engine server from a first format to a second format, wherein the web page is rendered on the search engine server; and for each one of said regions in the first wire frame:

if said one of said regions corresponds to any of the content-generating objects, then generating content to the web page, in said one of said regions, based on said corresponding content-generating objects; and if said one of said regions does not correspond to any of the content-generating objects, then causing the web page to be constructed so as to reflect the absence of content in said one of said regions.

\* \* \* \* \*